3,050,361
DECABORANE SALTS AND THEIR PREPARATION
Earl L. Muetterties, Chadds Ford, Pa., assignor to E. I. du Pont de Nemours and Company, Wilmington, Del., a corporation of Delaware
No Drawing. Filed Sept. 5, 1958, Ser. No. 759,148
14 Claims. (Cl. 23—14)

This invention relates to decaborane derivatives. More particularly, it relates to certain salts of decaborane and to a method for their preparation.

Decaborane is of considerable interest in various applications because of its ability to act as a reducing agent and as a curing agent for natural and synthetic rubbers. In the field of reducing agents, it is particularly desirable to develop new reducing agents having high degrees of selectivity as to the types of organic and inorganic compounds that they can reduce.

It is therefore an object of this invention to provide new decaborane derivatives having useful reducing properties and processes for their preparations. A further object is to provide novel salts of decaborane having useful rubber curing characteristics. Other objects will appear hereafter.

These and other objects are obtained by providing decaborane derivatives having the formula $M(B_{10}H_{12}X)$, wherein M is a member of the group consisting of ammonium radical and alkali metal atoms and X is a monovalent group composed of at least one element of groups V–A, VI–A or VII–A of the periodic table (as given in Deming's "General Chemistry," 5th Ed. (1944), John Wiley & Sons, Inc.) having an atomic number between 7 and 53, inclusive, optionally in combination with carbon or hydrogen, or both carbon and hydrogen.

The decaborane derivatives of this invention are prepared by reacting a solution of decaborane in a polar solvent, e.g., an ether, with a salt of the formula MX, wherein M and X have the meanings specified above. Reaction begins at ordinary temperatures with the evolution of hydrogen. As the reaction proceeds the reactant salt, MX, usually goes into solution. The reaction is illustrated by the following equation:

$$B_{10}H_{14} + MX \rightarrow MB_{10}H_{12}X + H_2$$

The reaction between decaborane and the salt takes place over a wide range of temperatures. Any temperature ranging from about −25° C. up to the decomposition temperature of the reaction product can be used. It is preferred to carry out the reaction at temperatures between about 0° and 100° C. It is especially convenient to carry out the reaction under reflux conditions at the boiling point of the solvent being employed.

The reaction product of this invention is a salt that results from the reaction of 1 mole of decaborane with 1 mole of the metal salt MX. Consequently, it is preferred to use equimolar quantities of the two reactants. However, an excess, e.g., up to a 100% excess, of either reactant can be employed if desired.

The reaction is continued until the evolution of hydrogen ceases, or until the reactants are completely dissolved in the reaction medium. The actual reaction time required is dependent on the particular reactants and on the particular temperature being employed. The reaction is usually substantially complete in two to three hours at temperatures of 20°–40° C. and in several minutes, e.g., 10–30 minutes at temperatures of 100° C. or higher, while at −25° C. several days, e.g. 2–5 days, may be required.

As indicated above, the reaction is carried out in the presence of a polar solvent. Ethers and ketones are especially useful polar solvents for use in this process. Illustrative of specific ethers that are useful in the process of this invention there can be named diethyl ether, dibutyl ether, dimethoxyethane, diethylene glycol dimethyl ether, tetrahydrofuran, and dioxane. Among the variety of ketones that can be used there can be mentioned, as illustrative examples, acetone, methyl ethyl ketone, cyclohexanone, and the like.

The reaction products isolated from reaction mixtures containing ethers as solvents are usually obtained in the form of their etherates. Preferably, the reaction mixture is concentrated to a small volume at the end of the reaction and added to an excess of dioxane in order to obtain a crystalline dioxanate. The ether-free salts can for the most part be obtained by heating the etherates to a temperature of 50–150° C.

The decaborane and the salts of the type MX described above used in the process of this invention can be the ordinary grades of these materials that are available commercially, or that can be made by known methods.

The products and process of this invention are illustrated in further detail in the following examples.

EXAMPLE I

A solution of 6.93 g. of decaborane (0.057 mole), dissolved in 85 ml. of freshly distilled 1,2-dimethoxyethane, is added dropwise to a 2.95 g. (0.060 mole) suspension of sodium cyanide in 125 ml. of the same solvent. The mixture is stirred and heated to 45° C. for 12 hours under a current of nitrogen. A light green solution is obtained. This solution is filtered into a flask containing about 750 ml. of dry dioxane. A white solid precipitates out. This is filtered, washed with heptane and dried in a current of nitrogen. The white solid is placed in a flask, and subjected to a vacuum until no more solvent can be removed. The final product amounts to 14.17 g. (72% yield).

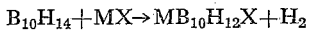
Analysis.—Calc'd for $NaB_{10}H_{12}CN \cdot 2C_4H_8O_2$: Na, 6.66%; B, 31.82%; N, 4.05%; C, 31.28%; H, 8.17%. Found: Na, 7.0%; B, 28.36%; N, 3.56%; C, 31.90%; H, 8.70%.

The bis-dioxanate of sodium cyanodecaborohydride is hygroscopic and is soluble in polar solvents, including ethers, ketones and water. It is insoluble in non-polar solvents such as, for example, pentane, hexane, and 2,4-dimethylbutane. Aqueous solutions of the bis-dioxanate of sodium cyanodecaborohydride are strongly reducing media. When silver nitrate, ferric chloride, and nickel chloride are added to aqueous solutions of the bis-dioxanate of sodium cyanodecaborohydride, the salts are reduced and the free metals are precipitated.

EXAMPLE II

A 50-ml. tetrahydrofuran solution of 4.90 g. (0.04 mole) of decaborane is introduced into a 125 ml. flask containing 1.96 g. (0.04 mole) of sodium cyanide and the reaction mixture is stirred vigorously by means of a magnetic stirrer. The tetrahydrofuran solution gradually turns dark green and hydrogen gas is evolved. Stirring is continued until no evolution of hydrogen can be detected. During this time approximately 0.04 mole of hydrogen is evolved (i.e., 1 mole of hydrogen per mole of decaborane used) and the sodium cyanide goes into solution. The tetrahydrofuran solution is then filtered in order to separate traces of unreacted sodium cyanide. The tetrahydrofuran is evaporated from the filtered solution at room temperature and the resulting gray oil is dried in a vacuum (ca. 0.001 mm. Hg) until all volatile material is removed. The crude product is dissolved in diethyl ether, the solution is filtered, and the filtrate is then evaporated to dryness. There is obtained 6.2 g. of the bis-diethyl etherate of sodium cyanodecaborohydride in the form of white crystals.

*Analysis.*—Calc'd for $NaB_{10}H_{12}CN \cdot 2(C_2H_5)_2O$: Na, 7.2%; B, 34.1%; C, 37.0%; H, 10.2%; N, 4.4%. Found: Na, 7.2%; B, 35.7%; C, 32.0%; H, 9.9%; N, 4.3%.

EXAMPLE III

A 100-ml. stainless steel reactor is charged with 1.48 g. of decaborane (0.0122 mole), 0.66 g. of sodium methoxide and 35 ml. of diethyl ether. The reactor is cooled with solid carbon dioxide-acetone and evacuated to about 0.001 mm. Hg. It is heated 10 hours at 90° C., and during this period 0.0106 mole of hydrogen (87% of theory) is collected. The ethereal solution is concentrated to about one-third of its original volume and 200 ml. of dioxane is added to it. A yellow precipitate forms immediately. The solid is separated by filtration. The final purification is carried out by extracting the crude yellow solid with dioxane in a Soxhlet extractor. A yellow solid is obtained which is $NaB_{10}H_{12}OCH_3 \cdot C_4H_8O_2$.

*Analysis.*—Calc'd. for $NaB_{10}H_{12}OCH_3 \cdot C_4H_8O_2$: Na, 8.8%; B, 41.2%; C, 22.9%; H, 8.8%. Found: Na, 8.8%; B, 40.1%; C, 21.3%; H, 8.5%.

The product is soluble in ethers, but insoluble in hydrocarbons. It dissolves in water with a slight degree of decomposition. Its aqueous solutions form strongly reducing media.

EXAMPLES IV-XX

When the metal salts listed in the second column of Table I are added to ethereal solutions of decaborane in equimolar proportions, or in excess, at room temperature, hydrogen is evolved and the decaborane derivatives listed in the third column of the table are formed.

*Table I*

| Example No. | Metal Salt | Product |
| --- | --- | --- |
| IV | NaSCN | $NaB_{10}H_{12}SCN$ |
| V | $NaOCOCH_3$ | $NaB_{10}H_{12}OCOCH_3$ |
| VI | KI | $KB_{10}H_{12}I$ |
| VII | CsF | $CsB_{10}H_{12}F$ |
| VIII | $NH_4SCN$ | $NH_4B_{10}H_{12}SCN$ |
| IX | KNCO | $KB_{10}H_{12}NCO$ |
| X | LiNCO | $LiB_{10}H_{12}NCO$ |
| XI | $NaNH_2$ | $NaB_{10}H_{12}NH_2$ |
| XII | NaCNO | $NaB_{10}H_{12}CNO$ |
| XIII | $NaNO_2$ | $NaB_{10}H_{12}NO_2$ |
| XIV | $NaClO_4$ | $NaB_{10}H_{12}ClO_4$ |
| XV | $NaIO_3$ | $NaB_{10}H_{12}IO_3$ |
| XVI | NaF | $NaB_{10}H_{12}F$ |
| XVII | $NaN_3$ | $NaB_{10}H_{12}N_3$ |
| XVIII | CsCl | $CsB_{10}H_{12}Cl$ |
| XIX | RbF | $RbB_{10}H_{12}F$ |
| XX | $NH_4I$ | $NH_4B_{10}H_{12}I$ |

The examples have illustrated the products of this invention by reference to certain decaborane derivatives. In addition to these particular salts, the following are also included in the products of this invention:

$NaB_{10}H_{12}Br$   $NaB_{10}H_{12}Sb(C_2H_5)_2$
$NaB_{10}H_{12}P(CH_3)_2$   $NaB_{10}H_{12}SeCH_3$
$NaB_{10}H_{12}As(C_2H_5)_2$   $NaB_{10}H_{12}TeCH_3$

These are formed by the reaction of decaborane with the following metal salts: sodium bromide, sodium dimethylphosphine; sodium diethylarsine, sodium diethylstibine, sodium methyl selenide, and sodium methyl telluride, respectively.

The decaborane derivatives of this invention are especially useful as reducing agents. As illustrated in Example I, aqueous solutions of these decaborane derivatives are capable of reducing metal salts to the free metals.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows.

I claim:
1. Compounds represented by the formula

$$M(B_{10}H_{12}X)$$

wherein M is a member of the group consisting of alkali metal atoms and the ammonium radical, and X is a monovalent group comprising at least one element selected from a group consisting of elements of groups V-A, VI-A and VII-A of the periodic table and having an atomic number of from 7 to 53, said compounds forming etherate addition products with ethers.

2. A compound of claim 1 wherein said element of the monovalent group is in combination with at least one member of the class consisting of carbon and hydrogen.

3. Sodium cyanodecaborohydride.

4. Bis-diethyl etherate of sodium cyanodecaborohydride.

5. Bis-dioxanate of sodium cyanodecaborohydride.

6. Process of reacting a solution of decaborane in a polar solvent with a salt of the formula $$MX$$

wherein M is a member of the group consisting of alkali metal atoms and the ammonium radical, and X is a monovalent group comprising at least one element selected from a group consisting of elements of groups V-A, VI-A and VII-A of the periodic table and having an atomic number of from 7 to 53.

7. Process of claim 6 wherein said element of the salt is in combination with at least one member of the class consisting of carbon and hydrogen.

8. Process of reacting a solution of a decaborane in a polar organic solvent with a salt of the formula $$MX$$

wherein M is a member of the group consisting of alkali metal atoms and the ammonium radical, and X is a monovalent group comprising at least one element selected from a group consisting of elements of groups V-A, VI-A and VII-A of the periodic table and having an atomic number of from 7 to 53 to form a solution in said solvent of a decaborane salt of the formula $$M(B_{10}H_{12}X)$$

wherein M and X are defined above.

9. Process of reacting a solution of decaborane in a polar solvent with a salt of the formula $$MX$$

wherein M is a member of the group consisting of alkali metal atoms and the ammonium radical, and X is a monovalent group comprising at least one element selected from a group consisting of elements of groups V-A, VI-A and VII-A of the periodic table and having an atomic number of from 7 to 53 to form a solution in said solvent of a decaborane salt of the formula $$M(B_{10}H_{12}X)$$

wherein M and X are as defined above and isolating said decaborane salt from solution in the form of the corresponding etherate of the decaborane salt.

10. Process of reacting a solution of decaborane in an ethereal solvent with a salt of the formula $$MX$$

wherein M is a member of the group consisting of alkali metal atoms and the ammonium radical, and X is a monovalent group comprising at least one element selected from a group consisting of elements of groups V-A, VI-A and VII-A of the preiodic table and having an atomic number of from 7 to 53 to form a solution in said solvent of a decaborane salt of the formula $$M(B_{10}H_{12}X)$$

wherein M and X are as defined above, isolating said decaborane salt from solution in the form of the etherate of the decaborane salt, and heating said etherate to a temperature of 50°–150° C. to obtain the ether-free decaborane salt.

11. Process for preparing sodium cyanodecaborohydride which comprises mixing an ether solution of decaborane with sodium cyanide until evolution of hydrogen ceases to form a solution of sodium cyanodecaborohydride, and recovering the product by isolating the bis-etherate of sodium cyanodecaborohydride from solution and heating said etherate to a temperature of 50°–150° C. to obtain ether-free sodium cyanodecaborohydride.

12. Process as defined in claim 11 wherein said etherate is the bis-diethyl etherate of sodium cyanodecaborohydride.

13. Process as defined in claim 11 wherein said etherate is the bis-dioxanate of sodium cyanodecaborohydride.

14. An aqueous solution of a compound as defined in claim 1 and an ether.

References Cited in the file of this patent
UNITED STATES PATENTS 2,402,315   Crowder _____ June 18, 1946
2,461,661   Schlesinger et al. _____ Feb. 15, 1949

OTHER REFERENCES

Hongh et al.: "Abstracts of Papers, 133rd Meeting, American Chemical Society," pages 28L and 29L, stamped receipt date March 31, 1958.

Gaylord: "Reduction With Complex Metal Hydrides," 1956, page 37.